Patented May 1, 1928.

1,668,445

UNITED STATES PATENT OFFICE.

EDWARD L. AIKEN, OF EAST ORANGE, NEW JERSEY, ASSIGNOR TO CARBOLOID PRODUCTS CORPORATION, OF NEWARK, NEW JERSEY, A CORPORATION OF NEW JERSEY.

METHOD OF MAKING FLEXIBLE MOLDED ARTICLES OF CONDENSATION PRODUCTS.

No Drawing. Application filed September 23, 1921, Serial No. 502,798. Renewed April 25, 1924.

My invention relates particularly to compositions of matter which, while basically different therefrom, have somewhat the same characteristics as phenol alhehyde condensation products but with marked advantages thereover; the invention also relates to the process of making such compositions of matter. My products may be prepared in a one-step process, or when desirable in a multi-step process, according to which I first produce intermediate products and then final products, and I generally prefer to have the multi-step process consist of two steps.

My products, both the intermediate and final, have the desirable characteristics of phenolic condensation products but differ therefrom in that they have highly desirable characteristics which it has been impossible to impart thereto. For example, I can produce an intermediate product which is so thinly fluid that it may be used alone for the impregnation of porous articles having very fine pores, for example, wood, without the necessity of using a solvent for the purpose of thinning out the liquid sufficiently so that it can penetrate into the fine pores as deeply as it may be desired.

Furthermore, by sufficient curing under proper conditions, I can produce a final infusible, insoluble condensation product having the usual desirable characteristics of phenol aldehyde condensation products with the additional advantageous one that it is possible to control the hardness and flexibility of the same whereby I can produce finished articles which may be bent almost double.

Another very advantageous feature of my invention is that my products may be cured into their final insoluble, infusible state by the mere application of heat, without the necessity of subjecting the material to pressure, either in the one stage process wherein the final product is made in one operation from the phenylglyceryl compound and a methylene body, or in a multi-stage process according to which I produce intermediate products.

Briefly stated, my invention comprises making a condensation product either intermediate or final, as may be desired, by condensing, with a body having available active methylene, a reaction product of phenol and a polyhydric alcohol in place of the phenolic body now generally used. Homologs or substitution products of phenol may be used in lieu thereof with good results; I prefer phenol, however, but intend the word "phenol" as used in this description and in the claims to include the equivalent homologs or substitution products of phenol, as well as phenol itself, and I intend the term "phenyl" to include, similarly, radicals which are the equivalents thereof. A number of the polyhydric alcohols may be used for the preparation of the body which is to be condensed with the body having available active methylene, some of these polyhydric alcohols being:—

Ethylene glycol _____ $C_2H_4(OH)_2$
Propylene glycol _____ $C_3H_6(OH)_2$
Butylene glycol _____ $C_4H_8(OH)_2$
Amylene glycol _____ $C_5H_{10}(OH)_2$
Glycerol or glycerine _____ $C_3H_5(OH)_3$ The use of glycerine results in a superior control of the hardness and flexibility, for which reason I prefer it to the other polyhydric alcohols, and I will describe my invention specifically with respect to glycerine.

The description relating to the preparation of the so-called glyceryl carbolates and the condensation thereof with active methylene compounds, relates equally well to compounds made by combining phenol or its homologs or substitution products with other polyhydric alcohols than glycerine, allowance being made of course for the different molecular and equivalent weights in determining the reacting proportions. The term "phenylsubalkyl compounds" as used in the claims is intended to include compounds resulting from combining phenol or its homologs or substitution products with any of the polyhydric alcohols, with the elimination of water.

The compound made by combining phenol and glycerol may have varying proportions of phenyl radical to glyceryl radical, and may possibly be glyceryl mono-, di-, or tri-carbolate, or possibly mixtures of these, which will depend of course, on the proportions of reagents used and also on the reaction conditions. I am not sure that the product which results from combining glycerol and phenol is a glyceryl carbolate however. It is possible that it may be a mono-, di-, or tri-phenyl glycerol or phenyl glyceryl alcohol, or possibly some other type of compound. Whatever the composition of this product may be, it has characteristics which differ materially from those of either glycerol or phenol, or a mere mixture thereof. For the purpose of identifying the substance I shall hereinafter call it "phenyl-glyceryl body".

This phenyl glyceryl body, after having been freed from water, is condensed with some suitable body having available methylene, such for example, as formaldehyde, paraform, hexamethylenetetramin, etc.

Such condensation produces an intermediate product which is liquid at normal temperature and is not resin-like at any time, although the degree of viscosity of this liquid is controllable and it may be made to have such viscosity as is most suitable for the particular use, while the final product made therefrom, as hereinafter described, when fully cured, may have various degrees of hardness and flexibility, ranging from a jelly-like substance to a celluloid-like substance. The intermediate liquid product may be used to impregnate cellular or fabric materials without the use of a solvent, if so desired, which is often the case, or it may be poured into molds or it may be mixed with any of the well known fillers such as wood flour, asbestos, cotton or wool fibers, silica, chalk, inert earths and other substances of like nature to form what may be called molding compounds, which may be formed into various shapes by any suitable method, such for example as forming in molds under pressure, and these may be subjected to heat. Or, when desired, it may be dissolved in a suitable solvent as for example, ethyl, methyl, or denatured alcohol, nitrobenzene, etc., to a concentration suitable for use as a varnish or lacquer. The curing into the final stage is brought about by heat either with or without the application of pressure.

My tri-carbolate may be prepared by mixing together three mols, that is 282 parts by weight, of phenol with one mol, that is 92 parts by weight of gylcerine. This mixture is heated in a suitable vessel to a temperature of 110° C. When this temperature is reached hydrochloric acid gas is introduced through a tube leading to the bottom of the liquid, the gas bubbling up being allowed to pass out of the container either to the atmosphere or into another vessel wherein it may be recovered or reused. Suitable apparatus should be provided; if the excess gas is allowed to pass to the atmosphere it may do so through a reflux condenser, or if it is to be recovered, the container may be closed except for a connection to a second vessel where the hydrochloric acid may be recovered. The mixture is treated with the hydrochloric acid gas until it is practically saturated, although this is not essential, as only so much of the gas may be used as is necessary to take up any free water present, either that originally in the mixture or that formed by the reaction between the phenol and the glycerol. Hydrochloric acid gas may be passed through the reaction mass during the whole period of the reaction, but this would result in waste. When the introduction of gas is stopped, the heating is continued for one or two hours to thoroughly interact the reagents. All the hydrochloric acid is then evaporated off, which may be done at a temperature of 110° C., until the compound tests neutral with an indicator. When neutral the compound will be found to be free from water when tested with anhydrous cupric sulphate, it is then allowed to cool to be subsequently condensed with the methylene body.

The corresponding di-substance is prepared in the same manner as the tri-substance, except that the proportions of the reagents in this case would be two mols or 188 parts by weight of phenol, to one mol, or 92 parts by weight of glycerine; and the preparation of the mono-substance is also similar, except that the phenol and glycerine are in equi-molecular proportions, that is 94 parts by weight of phenol to 92 parts by weight of glycerine.

The above mentioned phenylglyceryl compound may also be made by using a concentrated solution of hydrochloric acid instead of the gas with very satisfactory results, the concentrated solution being used in the proportions of about 3 to 5% of the weight of the reaction mass. The mixture may be heated at a temperature of 110° C. say in an open vessel, the water being evaporated off with the hydrochloric acid.

The phenylglyceryl compounds may also be prepared without the use of any acid as a catalyst or dehydrating agent, by using the reagents in the proportions stated, and heating up to a temperature of from 120 to 125° C., in a vessel provided with a reflux condenser. The removal of the water by this method takes about 30 hours with a quantity of about 500 grams whereas with the use of the acid either in solution or as gas, the action is completed in about three hours for the same quantity.

Of the three methods for making my carbolates so far described, I prefer that according to which hydrochloric acid gas is passed into the reaction mass.

These three methods are not the only ones according to which my phenylglyceryl compounds may be prepared. For example, I may mix phenol and glycerine in the various proportions above set forth and use anhydrous cupric sulphate to remove the water from the reaction mass. The amount of anhydrous cupric sulphate may be calculated on the basis of five molecules of water of crystallization, but the exact amount of sulphate used is not important, provided that it be sufficient to remove all of the water, as on excess of this dehydrating agent generally has no harmful effect. The whole quantity of the anhydrous cupric sulphate may be added at one time to the mixture, which is heated to, and maintained at a suitable temperature, for example, 110° C. at say atmospheric pressure, or it may be added in a number of smaller quantities; as the reaction proceeds the mass turns green, becoming very dark in about two hours. The hydrated copper sulphate is filtered from the liquid product which has a black color, very thin films being brownish black, particularly after standing for a few days. The color seems to be dissolved in the liquid, or at least extremely finely dispersed therein as it will pass through eight thicknesses of filter paper along with the liquid, and no precipitate or coloring remains on the paper.

When this compound is condensed with bodies having available methylene, it yields a final product having a jet black color. All of these phenylglyceryl compounds are liquid and slightly viscous, and have a reddish orange color except that made with anhydrous cupric sulphate.

The various phenylglyceryl compounds differ from mere mixtures of phenol and glycerine, which is water white in color. They change to a deep reddish orange color as the reaction progresses in the case of the product made without an acid and also when the acid is used. Furthermore, a mixture of phenol and glycerine in exact tri-phenylglyceryl proportions will solidify at about 12° C., the tri-phenylglyceryl compound made without acid at about 0° C., the tri-phenylglyceryl compounds made with hydrochloric acid gas at about −5° C., the di-phenylglyceryl compounds made with hydrochloric acid at about −7° C., and the di-phenylglyceryl compound made with hydrochloric acid gas below −7° C., at which temperature it shows no signs of solidifying.

My mono-, di- or tri-phenylglyceryl compounds may, as stated above, be esters having the constitution indicated by

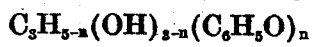

$C_3H_{5-n}(OH)_{3-n}(C_6H_5O)_n$ where n equals 1, 2 or 3, or they may be of an alcoholic nature such as indicated by the formula $C_3H_{5-n}(OH)_3(C_6H_5)_n$ where n also probably equals 1, 2 or 3; or they may possibly have some other constitution. At any rate, they differ both physically and chemically from a mere mixture of glycerine and phenol.

Tests have shown that water is formed in theoretical proportions in the preparation of the phenylglyceryl compounds from phenol and glycerine.

The glycerylphenyl compounds, whatever their constitution may be, are then condensed with a body containing available active methylene to form a glycerylphenyl condensation product, which differs as to certain features thereof from phenolic condensation products. This condensation reaction may be completed to form a final product in one stage, but in the majority of its industrial uses, a multi-stage, preferably a two-stage, process is preferred. I mix 100 parts by weight of the tri-phenylglyceryl compound, 23 parts by weight of paraform, and 2 parts by weight of ammonium carbonate in a suitable vessel fitted with a reflux condenser and open to the atmosphere, and heat the mixture to about 60° to 65° C. until the action of the ammonium carbonate becomes quiet. I then gradually increase the temperature to from 70° to 75° C. and maintain it thereat for several hours, the actual time depending on the viscosity desired in the resulting partially condensed liquid product. When the viscosity has reached the degree desired, which may be ascertained by suitable tests, I allow the partially condensed product to cool down to normal room temperature. The product is a more or less viscous anhydrous liquid, insoluble in water but freely soluble in ethyl, methyl, or denatured alcohol, amyl alcohol, ether and chloroform.

The ammonium carbonate is used as an alkaline catalyst or condensing agent, and may vary in amounts over a very wide range. I have found that about 9% of ammonium carbonate based on the amount of paraform used gives very satisfactory results, but this may be varied about 5% more or less without detriment to the compound. When a less amount is used, the reaction is slower, and when larger amounts are used, it is accelerated. Many other catalysts, such for example as sodium phenolate, calcium phenolate, sodium hydrate, calcium oxide, potassium carbonate, etc., may be used with very good results; and the reaction may even be carried on without the addition of any catalyst at all.

It is more or less immaterial how the reagents and catalysts are mixed for example, the full amount of the aldehyde and catalyst may be mixed in with the phenylglyceryl compound at the start, or either one or both may be added gradually without materially changing the results.

Another factor that may be varied over a considerable range is the temperature at which the reaction is caused to take place. In the example given, if the temperature is maintained at 70° to 75° C. for three to four hours, a thin slightly viscous liquid may be produced, which is suitable for the impregnation of cellular and fabric materials without the use of any solvent to reduce its viscosity and without heating above room temperature. Should a more viscous liquid or a semi-liquid similar to vaseline be desired, it is only necessary to continue the same heat for a longer time. The same results may be obtained by using a higher temperature for a shorter period of time, precautions being taken however, to maintain the temperature below that at which the heat developed by the reaction would cause the temperature to rise so rapidly as to cause the reaction to become violent. I have found that the temperature may with safety be allowed to rise gradually until it reaches a temperature of from 100° to 105° C., after the reaction has proceeded at about 70° C. for about one hour, and at such higher temperature a thick viscous semi-liquid can be produced in a much shorter time than at the lower temperature.

I may state here that to produce the final product by the one-stage process the temperature may be further increased, but this will be explained below. I may state as a general rule that any results obtained at any given temperature may also be obtained at a lower or higher temperature maintained respectively over a longer or shorter period of time.

This completes the first stage of my two-stage process and the product obtained thereby is the basic compound used in the second stage.

My liquid or semi-liquid initial product has a variety of industrial applications.

The thin liquid may be used without a thinning solvent or without heating to thin it for the impregnation of all materials having a cellular structure, or of textile fabrics or substances of a porous nature. Avoidance of a solvent is important in the impregnation art for the reason that the drying out or evaporation of the solvent leaves the impregnated material more or less porous. With the use of my liquid product the pores may be filled and they remain filled, leaving a substantially solid product. I am thus able to easily control the degree to which I desire to fill these pores; I can fill them completely by using my initial product without any solvent, or I can coat the inner walls of the pores to any desired thickness or thinness by impregnating the material with a solution of my initial product, the quantity of solvent to solute depending upon the thickness of the coating desired, relatively more solvent being used for thinner coatings.

It has been impossible to impregnate porous materials, textiles, etc., with phenolic condensation products without the use of a thinning solvent; for without the use of such a thinning solvent, the phenolic condensation products cannot be forced well into the cellular substances to be impregnated.

The use of my initial product thus makes it possible to fill the cells of the porous or cellular material completely with a solid substance, for the initial product may be solidified in situ and this is particularly the case if the moisture, air and other fluids contained in the cells are removed therefrom, which is frequently done particularly with wood by the application of a vacuum or reduced pressure, after which the impregnating compound may be forced thereinto.

Furthermore, since the flexibility of my final condensation product is controllable, it is possible to produce flexible impregnated materials and articles, the flexibility of which is likewise controllable.

The partially condensed liquid or semi-liquid may be dissolved in a suitable solvent and used as a varnish or lacquer, the viscosity being controlled by the amount of solvent used. The coating left after evaporation of the solvent has qualities heretofore unknown in lacquers or varnishes comprising phenolic condensation products for it may be converted or hardened into an insoluble, infusible but flexible coating, the flexibility of which may be controlled as desired.

My initial liquid or semi-liquid condensation product may be poured directly into suitable molds which may be either open or covered and may be converted into the final insoluble, infusible, but flexible product by mere heating, either with or without the use of pressure.

The partially condensed liquid or semi-liquid may be mixed as is done with phenolic condensation products with various substances to form so-called molding compounds, such substances as rubber, wood flour, asbestos, mica products, fibers, such as cotton, wool, etc., silica, graphite, cork, etc., each lending certain desirable characteristics to the compound. The partially condensed products in these mixtures act as binders, and when the mixture is subjected to heat, are converted into an insoluble, infusible, flexible solid, firmly binding the whole into a unitary mass. These mixtures may be given various shapes by any suitable means or method, for example, by pressing in molds and may then be cured into the final product by the application of heat, either with or without pressure.

The partially condensed product itself alone, or mixed with other substances, or in solution, may be given a suitable color. Dyes or pigments such as ruby red, acetyl red, ultramarine blue, methyl blue, methyl green, chrome green, methyl violet, carbon or lamp black and a great many others may be used.

What may be called the second stage of the process involves the further polymerization or condensation of the initial product, above described, either as such, or mixed with other materials, or when coated upon, or impregnated within, various articles.

The flexibility and hardness of my final, insoluble, infusible products may be controlled as follows:

If I combine mono, di, and tri-phenylglyceryl compounds with the same amount of available methylene, the mono-compound resulting will be found to be more flexible than the corresponding di-compound, and the latter will be found to be more flexible than the tri-compound. This difference in flexibility is considerably less, however, than that which will be observed by varying the amount of the available methylene used, this latter extending over a considerable range, as solid, infusible, flexible products can be obtained by using amounts of paraform varying in quantity from 8½% to 32% of the weight of the phenylglyceryl compound used; that is with the mono-compound, I may use from 8½% to 19% of paraform, with the di-compound from 11½% to 28% of paraform, and with the tri-compound from 13% to 32% of paraform, all calculated on the weight of the phenylglyceryl compound and not on the total mixture.

The range of degrees of flexibility of the final fully condensed product can thus be made to vary very materially and may range from a product similar to a stiff jelly produced by the smaller amounts of paraform, to a product similar in flexibility to tortoise shell when the larger amounts of paraform are used.

The hardening or curing may be brought about by the mere application of heat, and pressure may be used or not, as desired.

Articles that have been impregnated with, or coated with, or made of my partially condensed compound may be placed directly in a suitable oven or heating chamber that may be heated by means of gas, steam or electricity and therein subjected to a temperature of about 100° to 105° C., for a short time, depending more or less on the thickness of the mass to be cured. This time ordinarily may be about one to two hours. The temperature can then be gradually increased to from 120° to 125° C. and maintained at this temperature until the partially condensed compound is fully and completely cured, or if the requirements of the use of the finished article do not demand complete polymerization or condensation the articles may be removed from the heating chamber prior thereto and allowed to cool to normal temperature. It may be here stated that pressures above normal atmospheric pressure are never essential but are sometimes useful, as the application thereof makes possible the application of a higher temperature at the beginning of the operation whereby the total time of curing is lessened. The exact time necessary for the curing of an article made of, or containing my compounds cannot be definitely stated as this will depend on the temperature applied and the dimensions of the article, but it may be stated as a general rule, that the lower the temperature, the longer the curing step will be.

I have used temperatures as high as 180° C. for curing and find that if this temperature be reached gradually it will have no very great deleterious effect; but this tends to produce a rather hard oxidized surface which, however, might be desirable in some cases.

Articles that have been varnished or lacquered with a solution of my initial product, should be allowed to stand in the air or gently heated to a temperature below the boiling point of the solvent for the purpose of removing the solvent. They may then be placed in heating chambers and the final curing may be carried out as previously described, which requires a comparatively short time on account of the compound being in the form of a very thin film.

When my initial product is poured into molds the curing process may be carried out as previously described, care being taken that the temperature is not allowed to be excessive at the start when curing at atmospheric pressure, in order to avoid the formation of blisters on the surface, due to the violent formation of gas in the reaction. When my initial product is mixed with other substances to form plastic molding compounds, such compounds may be placed in molds and subjected to pressure in closing them for the purpose of causing the plastic mass to conform accurately to the configuration of the mold. The shaped article may then be removed from the mold and cured in suitable heating chambers, as previously described, or they may be cured before removal from the mold by heating it in any suitable manner, and the molds may be kept opened or closed, thus subjecting the mass to atmospheric or greater pressure. When the molds are kept closed temperatures as high as 175° C. may be used, and the curing may be accomplished in a relatively short length of time, say in from five to ten minutes for small articles, and a proportionately longer time for larger ones. Or, if desired, the molded articles may be partially cured in molds and then removed and finished in an oven or heating chamber.

Sheets of paper or fabric, or a great many other varieties of sheets may be surface coated with, immersed in, or impregnated with, my initial product. They may be passed through calender or other rolls for the purpose of removing the excess of applied compound. The individual sheets may then be cured to the final state, or a number of such sheets may be superposed and pressed together in suitable molds and so cured, as above described, thus forming sheet material having great strength, flexibility and resistance to chemicals.

I have set forth above a number of applications of my two-step process which is the one I generally prefer, but it is not to be considered as limited to the examples above described.

Briefly restated, my two-step process consists in reacting on my phenylglyceryl compounds with available methylene until a partial condensation or polymerization takes place, whereupon the reaction is stopped, other substances may or may not be incorporated with the product so obtained, heat is applied and the condensation or polymerization nearly or wholly completed.

The method I use to obtain the final solid product in one stage is as follows: I use the same proportions and treat them in the same way as described for the two-stage process up to the point where the substances have reacted from three to four hours at 75° C. I then gradually increase the temperature up to 120° to 125° C., which ordinarily should take about two hours, and I maintain this last mentioned temperature until the curing is nearly or wholly completed. The final product so obtained is a semi-transparent solid usually having reddish orange tint and it is insoluble and infusible and of various degrees of flexibility at normal temperatures, depending upon the proportions of the various substances used; and it is more flexible when hot than when cold.

The final product obtained by either the one or two-stage process is exactly the same insofar as the condensation product itself is concerned but one of the advantages of the two-stage process is that substances may be mixed with the intermediate condensation product, all firmly bound together in one solid mass which possesses all the advantages of the well known phenolic condensation products with the brittleness of the latter eliminated, and with a wide range of flexibility at normal room temperature which may be perfectly controlled, as above set forth. My final product is insoluble in the common solvents and is furthermore infusible, but may be made softer and more flexible by the application of heat, but it cannot be liquefied. It may be carbonized with sufficient heat but burns in a flame very slowly and it is, therefore, a very poor supporter of combustion and it is resistant to a great many chemicals.

In my co-pending applications, filed of even date herewith, Serial Numbers 502,796 and 502,797, I claim the manufacture of the preliminary phenylglyceryl compound as well as the manufacture of my condensation product, and also the impregnation of articles therewith.

One of the essential features of my invention, as set forth herein above, is the condensation of the phenylglyceryl or phenylsubalkyl compound with available methylene; and by the terms "essentially a phenylglyceryl body" and "essentially a phenylsubalkyl body" I mean such body in at least commercially pure condition, and practically free from accidentally present reaction ingredients.

Having thus described my invention, what I claim as new and desire to secure by Letters-Patent, is:—

1. The process of making a flexible article which includes condensing essentially a phenylglyceryl body with available methylene to form an intermediate product, shaping said intermediate product without pressure, and heating the shaped article to cure it.

2. The process of making a flexible article which includes condensing essentially a phenylglyceryl body with available methylene to form an intermediate product, shaping said intermediate product without pressure, and heating the shaped article at atmospheric pressure to cure it.

3. The process of making a flexible article which includes condensing essentially a phenylglyceryl body with available methylene to form an intermediate product, shaping said intermediate product without pressure, and heating the shaped article at a temperature of about 100° to 105° C. to cure it.

4. The process of making a flexible article which includes condensing essentially a phenylglyceryl body with available methylene to form an intermediate product, shaping said intermediate product without pressure, and heating the shaped article at a temperature of about 100° to 105° C. at atmospheric pressure, to cure it.

5. The process of making a flexible article which includes condensing essentially a phenylglyceryl body with available methylene to form an intermediate product, shaping said intermediate product without pressure, heating the shaped article at a temperature of about 100° to 105° C., and then gradually increasing the temperature to, and maintaining it at about 120° to 125° C.

6. The process of making a flexible article which includes condensing essentially a phenylglyceryl body with available methylene to form an intermediate product, shaping said intermediate product without pressure, heating the shaped article at a temperature of about 100° to 105° C. at atmospheric pressure, and then gradually increasing the temperature to, and maintaining it at, about 120° to 125° C. at atmospheric pressure.

7. The process of making a flexible article which includes condensing essentially a phenylglyceryl body with available methylene to form an intermediate product, mixing filling material with said product, shaping it without pressure, and heating the shaped article to cure it.

8. The process of making a flexible article which includes condensing essentially a phenylglyceryl body with available methylene to form an intermediate product, mixing filling material with said product, shaping it without pressure, and heating the shaped article at atmospheric pressure to cure it.

9. The process of making a flexible article which includes condensing essentially a phenylglyceryl body with available methylene to form an intermediate product, mixing filling material with said product, shaping it without pressure, and heating the shaped article at a temperature of about 100° to 105° C. to cure it.

10. The process of making a flexible article which includes condensing essentially a phenylglyceryl body with available methylene to form an intermediate product, mixing filling material with said product, shaping it without pressure, and heating the shaped article at about a temperature of 100° to 105° C. at atmospheric pressure to cure it.

11. The process of making a flexible article which includes condensing essentially a phenylglyceryl body with available methylene to form an intermediate product, mixing filling material with said product, shaping it, without pressure, heating the shaped article at a temperature of about 100° to 105° C., and then gradually increasing the temperature to, and maintaining it at about 120° to 125° C.

12. The process of making a flexible article which includes condensing essentially a phenylglyceryl body with available methylene to form an intermediate product, mixing filling material with said product, shaping it without pressure, heating the shaped article at a temperature of about 100° to 105° C., at atmospheric pressure, and then gradually increasing the temperature to and maintaining it at about 120° to 125° C., at atmospheric pressure.

13. The process of making a flexible article which includes condensing essentially a compound derived from the combination of a phenol and a polyhydric alcohol with the elimination of water with available methylene to form an intermediate product, shaping said intermediate product without pressure, and heating the shaped article to cure it.

14. The process of making a flexible article which includes condensing essentially a compound derived from the combination of a phenol and a polyhydric alcohol with the elimination of water with available methylene to form an intermediate product, shaping said intermediate product without pressure, and heating the shaped article at atmospheric pressure to cure it.

15. The process of making a flexible article which includes condensing essentially a compound derived from the combination of a phenol and a polyhydric alcohol with the elimination of water with available methylene to form an intermediate product, shaping said intermediate product without pressure, and heating the shaped article at a temperature of about 100° to 105° C. to cure it.

16. The process of making a flexible article which includes condensing essentially a compound derived from the combination of a phenol and a polyhydric alcohol with the elimination of water with available methylene to form an intermediate product, shaping said intermediate product without pressure, and heating the shaped article at a temperature of about 100° to 105° C. at atmospheric pressure, to cure it.

17. The process of making a flexible article which includes condensing essentially a compound derived from the combination of a phenol and a polyhydric alcohol with the elimination of water with available methylene to form an intermediate product, shaping said intermediate product without pressure, heating the shaped article at a temperature of about 100° to 105° C. and then gradually increasing the temperature to, and maintaining it at about 120° to 125° C.

18. The process of making a flexible article which includes condensing essentially a compound derived from the combination of a phenol and a polyhydric alcohol with the elimination of water with available methylene to form an intermediate product, shaping said intermediate product without pressure, heating the shaped article at a temperature of about 100 to 105° C. at atmospheric pressure, and then gradually increasing the temperature to, and maintaining it at, about 120° to 125° C., at atmospheric pressure.

19. The process of making a flexible article which includes condensing essentially a compound derived from the combination of a phenol and a polyhydric alcohol with the elimination of water with available methylene to form an intermediate product, mixing filling material with said product without pressure, shaping it, and heating the shaped article to cure it.

20. The process of making a flexible article which includes condensing essentially a compound derived from the combination of a phenol and a polyhydric alcohol with the elimination of water with available methylene to form an intermediate product, mixing filling material with said product without pressure, shaping it, and heating the shaped article at atmospheric pressure to cure it.

21. The process of making a flexible article which includes condensing essentially a compound derived from the combination of a phenol and a polyhydric alcohol with the elimination of water with available methylene to form an intermediate product, mixing filling material with said product without pressure, shaping it, and heating the shaped article at a temperature of about 100° to 105° C. to cure it.

22. The process of making a flexible article which includes condensing essentially a compound derived from the combination of a phenol and a polyhydric alcohol with the elimination of water with available methylene to form an intermediate product, mixing filling material with said product without pressure, shaping it, and heating the shaped article at about a temperature of 100° to 105° C. at atmospheric pressure to cure it.

23. The process of making a flexible article which includes condensing essentially a compound derived from the combination of a phenol and a polyhydric alcohol with the elimination of water with available methylene to form an intermediate product, mixing filling material with said product without pressure, shaping it, heating the shaped article at a temperature of about 100° to 105° C., and then gradually increasing the temperature to, and maintaining it at about 120° to 125° C.

24. The process of making a flexible article which includes condensing essentially a compound derived from the combination of a phenol and a polyhydric alcohol with the elimination of water with available methylene to form an intermediate product, mixing filling material with said product without pressure, shaping it, heating the shaped article at a temperature of about 100° to 105° C. at atmospheric pressure, and then gradually increasing the temperature to and maintaining it at about 120° to 125° C. at atmospheric pressure.

In testimony whereof, I affix my signature.

EDWARD L. AIKEN.